US006886978B2

(12) United States Patent
Tokita et al.

(10) Patent No.: US 6,886,978 B2
(45) Date of Patent: May 3, 2005

(54) ELECTRONIC CLINICAL THERMOMETER

(75) Inventors: Muneo Tokita, Kyoto (JP); Satoshi Nakajima, Kyoto (JP); Shigeru Makita, Kyoto (JP)

(73) Assignee: OMRON Corporation, Kyoto (JP)

(*) Notice: Subject to any disclaimer, the term of this patent is extended or adjusted under 35 U.S.C. 154(b) by 0 days.

(21) Appl. No.: 10/166,586

(22) Filed: Jun. 5, 2002

(65) Prior Publication Data

US 2002/0191675 A1 Dec. 19, 2002

(30) Foreign Application Priority Data

Jun. 18, 2001 (JP) ....................................... 2001-184134

(51) Int. Cl.[7] .......................... G01K 7/42; A61B 5/001

(52) U.S. Cl. ......................... 374/169; 374/134; 374/30; 600/549

(58) Field of Search ................................ 374/169, 163, 374/164, 170, 100, 134, 29, 30; 600/474, 549

(56) References Cited

U.S. PATENT DOCUMENTS 3,404,678 A * 10/1968 Von Ardenne .............. 600/483
3,491,596 A * 1/1970 Dean .......................... 374/178
3,933,045 A * 1/1976 Fox et al.
4,158,965 A * 6/1979 Prosky
4,183,248 A * 1/1980 West
5,015,102 A * 5/1991 Yamaguchi ................. 374/107
5,017,018 A * 5/1991 Iuchi et al.
5,066,141 A * 11/1991 Ikeda et al. ................. 374/169
5,127,742 A * 7/1992 Fraden
5,216,625 A * 6/1993 Rall ........................... 702/134
RE34,507 E * 1/1994 Egawa et al.
5,293,877 A * 3/1994 O'Hara et al.
5,352,039 A * 10/1994 Barral et al.
5,755,670 A * 5/1998 McKown et al. ........... 600/505
6,149,297 A * 11/2000 Beerwerth et al.
6,219,573 B1 * 4/2001 Pompei
6,220,750 B1 * 4/2001 Palti
6,245,094 B1 * 6/2001 Pompei ...................... 607/104
6,250,802 B1 * 6/2001 Dotan
6,356,774 B1 * 3/2002 Bernstein et al. ........... 600/323
6,533,731 B2 * 3/2003 Pottgen et al. .............. 600/549
6,575,922 B1 * 6/2003 Fearnside et al. .............. 601/2
6,719,780 B1 * 4/2004 Salmon et al. .............. 607/108
6,827,487 B2 * 12/2004 Baumbach .................. 374/164
2003/0040783 A1 * 2/2003 Salmon ...................... 607/111

FOREIGN PATENT DOCUMENTS

DE 3527942 A * 2/1987 ............ G01K/7/00
JP 56060326 * 5/1981
JP 61000728 A * 1/1986
JP 61241631 A * 10/1986
JP 01189526 A * 7/1989
JP 03126471 A * 5/1991 ............ A61N/1/40
JP 03196206 A * 8/1991 .......... G05D/23/19
JP 3273121 A * 12/1991 ............. G01J/5/10
JP 04352971 A * 12/1992 ............ A61N/5/02
JP 2003010230 A * 1/2003 ............. A61F/7/08

* cited by examiner

*Primary Examiner*—Gail Verbitsky
(74) *Attorney, Agent, or Firm*—Beyer Weaver & Thomas LLP

(57) ABSTRACT

An electronic clinical thermometer has a probe including a variable-temperature heater and one or more temperature sensors and may also include a heat flux sensor. Physical variables such as temperature, time rate of change in temperature and/or heat flow rate are directly measured at positions on the surface of a patient while being heated by the heater through a thermally insulating member. Such measured values are used to solve a heat transfer equation rewritten as lower-order equations. Measurements may be controlled to be taken at a desired timing such as at specified intervals. The probe for contacting the patient's body may be planar or in an elongated bar-shape.

21 Claims, 11 Drawing Sheets

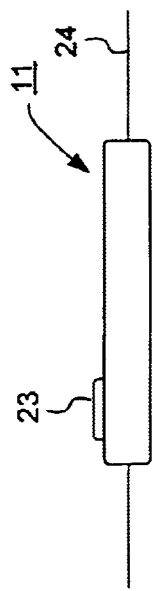
FIG. 9A
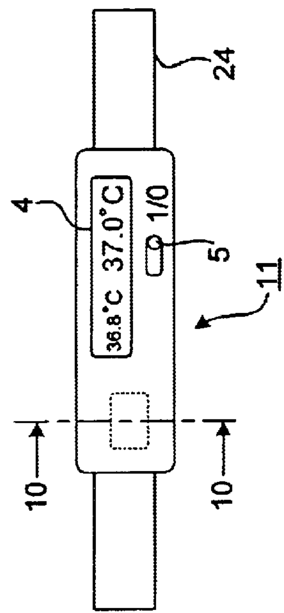
FIG. 9B
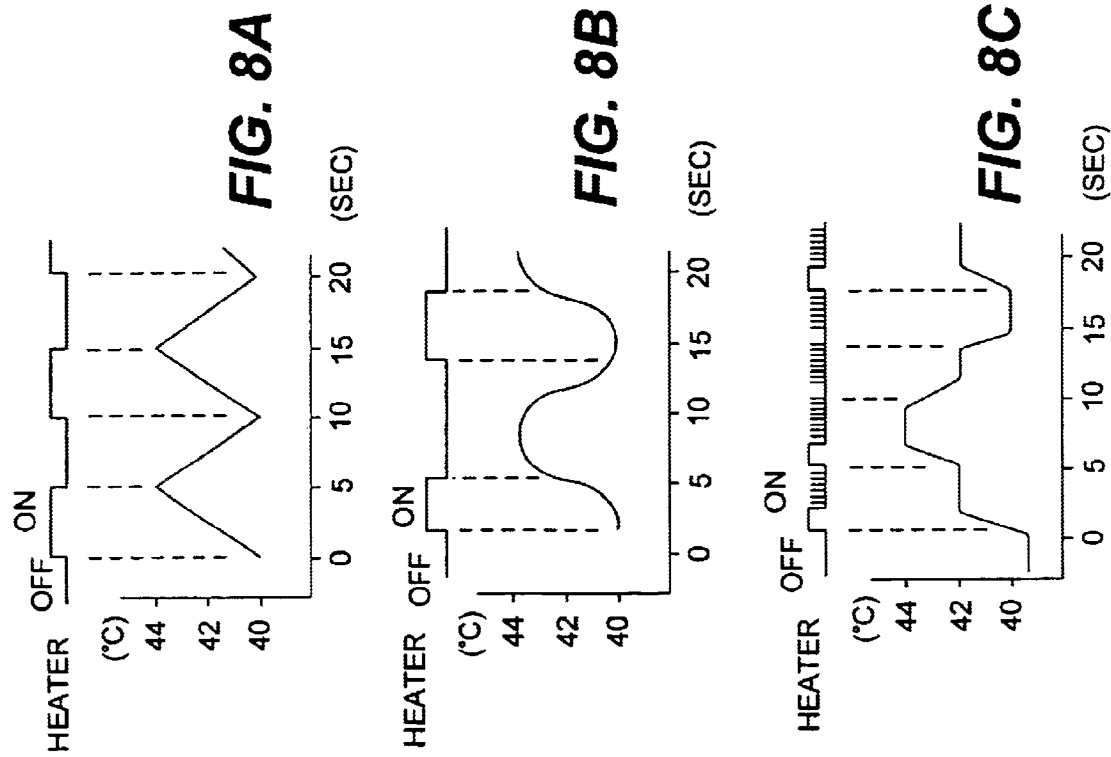
FIG. 8A
FIG. 8B
FIG. 8C

ELECTRONIC CLINICAL THERMOMETER

BACKGROUND OF THE INVENTION

This invention relates to an electronic thermometer for estimating the temperature at an inner position of a live body based on temperature data taken on the body surface. More particularly, the invention relates to such an electronic thermometer using a heat transfer equation for making such an estimate.

When a conventional clinical thermometer such as a mercury thermometer is used to measure the temperature of a body by having it held under an arm or the tongue, the thermometer must be kept in that position until a thermal equilibrium is reached between the internal body position of interest and the surface temperature.

Japanese Patent Publication Tokko Hei 7-119656 B2 disclosed a method of using an equation for estimating the change in temperature while reaching an equilibrium and regarding such an equilibrium temperature as the body temperature.

It is desirable, however, to measure the internal body temperature of a patient directly. International Patent Publication WO-9850766 disclosed an electronic thermometer based on a method published in "Engineering of Heat Conduction" (at page 90) by Masahiro Shoji (published by Tokyo University). According to this method, temperatures are measured at two different positions and the temperature at a third position outside the region of the two positions is estimated. What is desired, however, is an electronic thermometer for measuring not a surface temperature but an inner temperature.

If the measurement cannot be taken until a thermal equilibrium is reached between the surface and inner temperatures, it takes as long as 10 minutes until the measurement can be taken. This wait time can be reduced by a method of estimating the inner temperature from the manner in which temperature changes to reach the equilibrium, but it still takes about 90 seconds. This method cannot fully take into account individual variations among patients or environmental changes.

As for the method according to International Patent Publication WO-9850766, since it is based on temperature changes due to conduction of heat from a live body, the thermometer must be removed from the live body for repeated measurements.

SUMMARY OF THE INVENTION

It is therefore an object of this invention to provide an electronic clinical thermometer capable of accurately and quickly estimate the internal body temperature of a live body at a desired timing.

In view of the above and other objects of this invention, the temperature on an external surface of a target body is measured directly on real time according to this invention and the body temperature at a normally inaccessible internal position of the body is estimated on the basis of values thus obtained. For this purpose, a heat transfer equation is solved in reverse. Such an equation is solved as a lower-order equation such as a first-order differential equation including measurable physical quantities such as the body surface temperature and the heat flux as variables. The desired internal temperature is then estimated by directly measuring these physical quantities. If as many different measured quantities are obtained as there are variables, the internal temperature can be obtained accurately and quickly by solving simultaneous first-order equations.

An electronic clinical thermometer embodying this invention may be characterized broadly as comprising temperature measuring means (or a "temperature measuring device") for measuring temperature, heating means (or a "heater") for heating at a variable temperature, and estimating means (or an "estimating circuit") for estimating the temperature inside a live body from the variable temperature of heating and the temperatures measured by the temperature measuring means. When a heat transfer equation is solved in reverse to estimate the temperature inside a live body, as explained above, it is necessary to obtain at least as many measured values as the number of variables in the lower-order equations which express the transfer equation. If the thermometer is continuously kept in contact with the target body, the thermometer approaches a thermal equilibrium with the body and the variations in the measured values become small. According to this invention, the temperature of a heater is affirmatively varied for varying the flow of heat between the thermometer and the target body such that not only can highly accurate measurements be made but they can be made at a desired timing. The heater may be controlled such that an estimate of internal body temperature can be made as a signal is outputted at a desired timing while the temperature is continuously varied. If measurements are to be taken at specified time intervals, the heater may be controlled such that temperature will be varied according to the timing of the measurements.

In one aspect of the invention, the temperature measuring means comprises a first temperature sensor and a second temperature sensor. A thermally insulating member is disposed between these first and second temperature sensors. The first temperature sensor measures temperature of a position proximal to the heating means, and the second temperature sensor measures temperature at a position on the live body opposite to the heating means across the insulating material. Thus, temperatures at two different positions (although proximal to each other) may be selected as directly measurable physical variables for solving the heat transfer equation. The insulating member inserted between the two temperature sensors makes it possible to obtain stable temperature curves and hence more accurate results of measurement.

In another aspect of the invention, not only does the temperature measuring means comprise a first temperature sensor and a second temperature sensor, but the thermometer also comprises a first insulating member between the heating means and the first temperature sensor and a second insulating member having different heat-conducting properties between the heating means and the second temperature sensor. The first temperature sensor measures temperature on the live body at a position opposite to the heating means across the first insulating member, and the second temperature sensor measures temperature on the live body at another position opposite to the heating means across the second insulating member. Thus, temperatures at two positions separated from the heating means through different insulating members may be selected as directly measurable physical variables to solve the heat transfer equation in reverse. In the above, the two insulating members characterized as having different heat-conducting properties may be different not only in thermal conductivity but also in thickness or in specific heat.

In still another aspect of the invention, the thermometer further includes a heat flux sensor and a thermally insulating member disposed between the heating means and both the temperature measuring means and the heat flux sensor. The estimating means estimates temperature inside the live body from the variable temperature of heating and temperatures measured by the temperature measuring means and the heat flux sensor. The temperature measuring means and the heat flux sensor are disposed opposite to the heating means across the insulating means and measure respectively temperature and heat flux at positions proximal to each other. In this case, temperature and flux of heat flow at mutually proximal positions on the body across from the heating means are selected as directly measurable physical variables for solving the heat transfer equation in reverse.

In a further aspect of this invention, the thermistor also includes a memory and a controller for controlling the temperature-estimating operations of the thermometer. The thermometer may thus be controlled so as to carry out the temperature-estimating operations at specified time intervals and to store estimated temperature values in the memory.

The probe for contacting the live body may be shaped differently. An elongated bar-shape is preferable for inserting in the armpit or under the tongue if the patient is capable of maintaining a body position suitable for the temperature measurement. A planar probe is preferable if otherwise, for example, if the patient is an infant. It is preferable to employ a material with a high thermal conductivity where the probe contacts the live body.

Thermometers according to this invention are convenient for taking measurements continuously, for example, for a patient in an intensive care unit or for monitoring a patient after surgery because temperature measurements can be taken at a desired timing and the measured valued can be stored.

BRIEF DESCRIPTION OF THE DRAWINGS

FIGS. 8A, 8B and 8C are examples of ways in which the heater in the thermometer of FIG. 2 may be controlled.

FIG. 9A is a side view and FIG. 9B is a plan view of a variation of the thermometer according to the first embodiment of the invention.

DETAILED DESCRIPTION OF THE INVENTION

Figure 1:
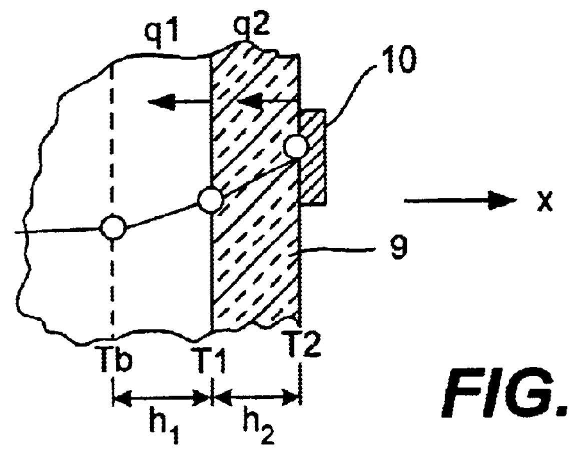
FIG. 1 is a sectional view of a portion of a patient's body for explaining the principle of measurement by a thermometer according to a first embodiment of the invention.

The invention is described next by way of examples. FIG. 1 shows $T_b$ as the temperature at an internal position of a patient to be estimated. $T_1$ and $q_1$ respectively indicate the temperature and the flux of heat flow at an externally exposed body surface position, separated from the target position by a distance of $h_1$. The heat conductivity of the body is expressed as $\lambda_1$. $T_2$ and $q_2$ respectively indicate the temperature and the flux of heat flow at a corresponding position separated by a thermally insulating member 9 with density ρ, specific heat c, thickness h and heat conductivity $\lambda_2$. Then, the copservation law of physics gives:

$$-q_1+q_2=\rho\ ch_2(dT_1/dt)=\lambda_1(dT_1/dx)-\lambda_2(dT_2/dx),$$

or $$(dT_1/dx)=\omega_1(T_b-T_1)-\omega_2(T_1-T_2)$$

where $\omega_1=\lambda_1/(\rho ch_1h_2)$, $\omega_2=\lambda_2/(\rho ch_2^2)$ and x generally represents the direction of the line connecting the internal target body position and the surface position where the surface body temperature and the heat flux are measured. Thus, if $T_1$, $dT_1/dt$ and $T_2$ are measured, $T_b$ can be calculated from these measured values. If a heater with variable temperature is used to vary the value of $T_2$, it is possible to vary $T_1$, $dT_1/dt$ and $T_2$ at a desired timing. In other words, if it is desired to calculate $T_b$ from the temperature change occurring due to the heat conducted from the body interior, the temperature sensor and the body temperature reach a thermal equilibrium and temperature change ceases to exist soon. Thus, different measured values cannot be obtained and accurate calculation of $T_b$ becomes difficult. If $T_2$ is affirmatively changed, as explained above, different measured values of $T_1$, $dT_1/dt$ and $T_2$ can be obtained at any desired timing and hence accurate calculation for $T_b$ becomes possible.

Figure 2:
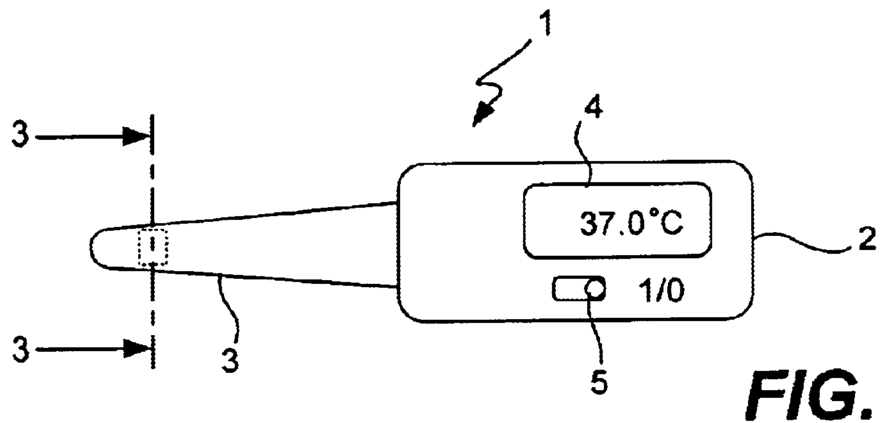
FIG. 2 is an external plan view of an electronic thermometer according to the first embodiment of the invention.
Figure 3:
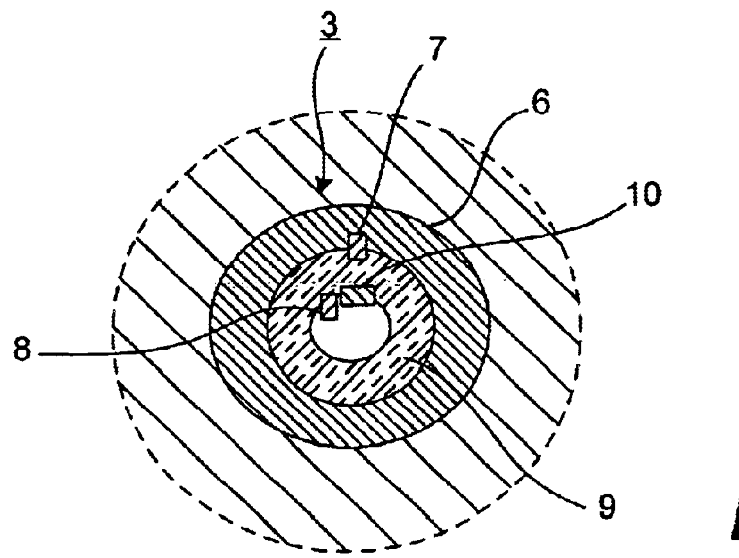
FIG. 3 is a sectional view of the thermometer of FIG. 2 taken along line 3—3.

FIG. 2 shows an electronic thermometer 1 according to a first embodiment of the invention comprising a main body 2 which is approximately in the shape of a rectangular parallelopiped and a probe 3 which protrudes longitudinally in the shape of a bar from the main body 2 such that the user may hold the main body 2 to insert the probe under an arm or under the tongue. The main body 2 contains a display device 4 such as an LCD for displaying data such as a measured value and a power switch 5. The probe 3 is approximately circular in cross-section, as shown in FIG. 3, and its outer surface is covered with a thin material 6 such as SUS having a high thermal conductivity. A temperature sensor 7 is disposed on the inner surface of this cover material 6. A variable-temperature heater 10 and a temperature sensor 8 are disposed proximally to each other on a thermally insulating member 9 on the inner surface of the cover material 6. Lead wires (not shown) connected to the temperature sensors 7 and 8 and the heater 10 may be passed through the hollow interior of the insulating member 9. Examples of a practically usable temperature sensor include IC temperature sensors using temperature characteristics such as platinum resistors, thermistors, thermo-couples and transistors.

Figure 4:
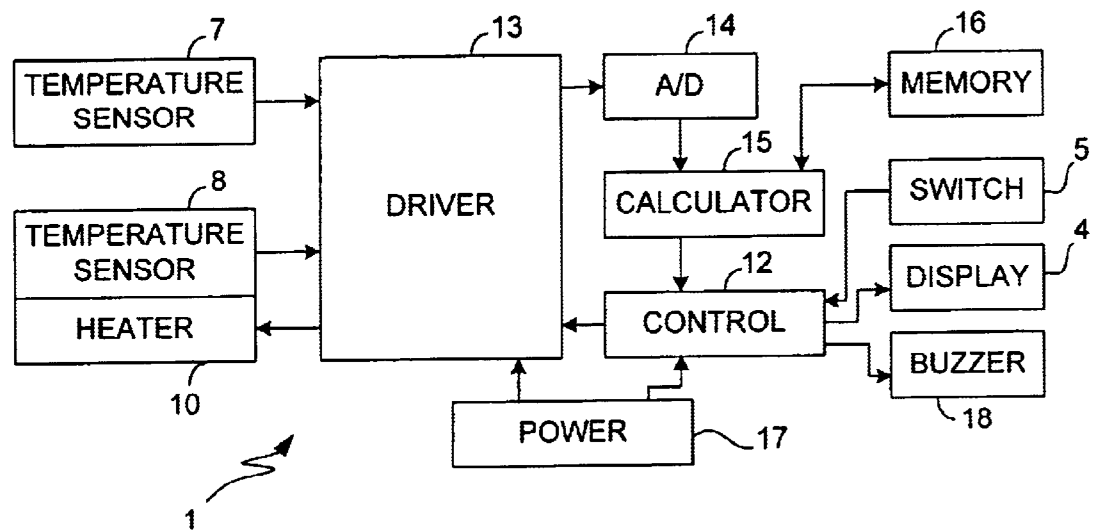
FIG. 4 is a block diagram for showing the circuit structure of the thermometer of FIG. 2.

As shown in FIG. 4, the electronic thermometer 1 comprises a controller 12, a driver 13, an A/D converter 14, a calculator 15, a memory 16, a power source 17 and a buzzer 18, in addition to the aforementioned temperature sensors 7 and 8, the variable-temperature heater 10, the power source switch 5 and the display device 4. The controller 12 comprises a CPU and serves to control the thermometer as a whole. The driver 13 is for driving the temperature sensors 7 and 8 and the heater 10 on the basis of signals received from the controller 12. Signals outputted from the driver 13 are converted into digital signals by the A/D converter 14 and inputted to the calculator 15. The calculator 15 performs various calculations and outputs the results of the calculations to the controller 12. The calculator 15 also operates to store specified data in the memory 16 and to retrieve data from the memory 16 to carry out specified calculations. The power source 17 may comprise a battery and serves to supply electric power to the controller 12 and the driver 13. The power switch 5 is for switching on and off the supply of power from the power source 17. The buzzer 18 is for generating a specified sound in response to a command from the controller 12 to alert the user of a certain situation.

Figure 6A:
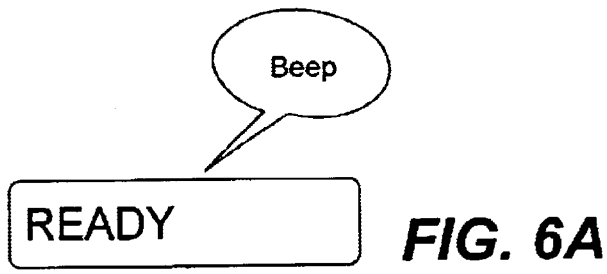
FIGS. 6A and 6B are examples of displays on the display device.
Figure 5:
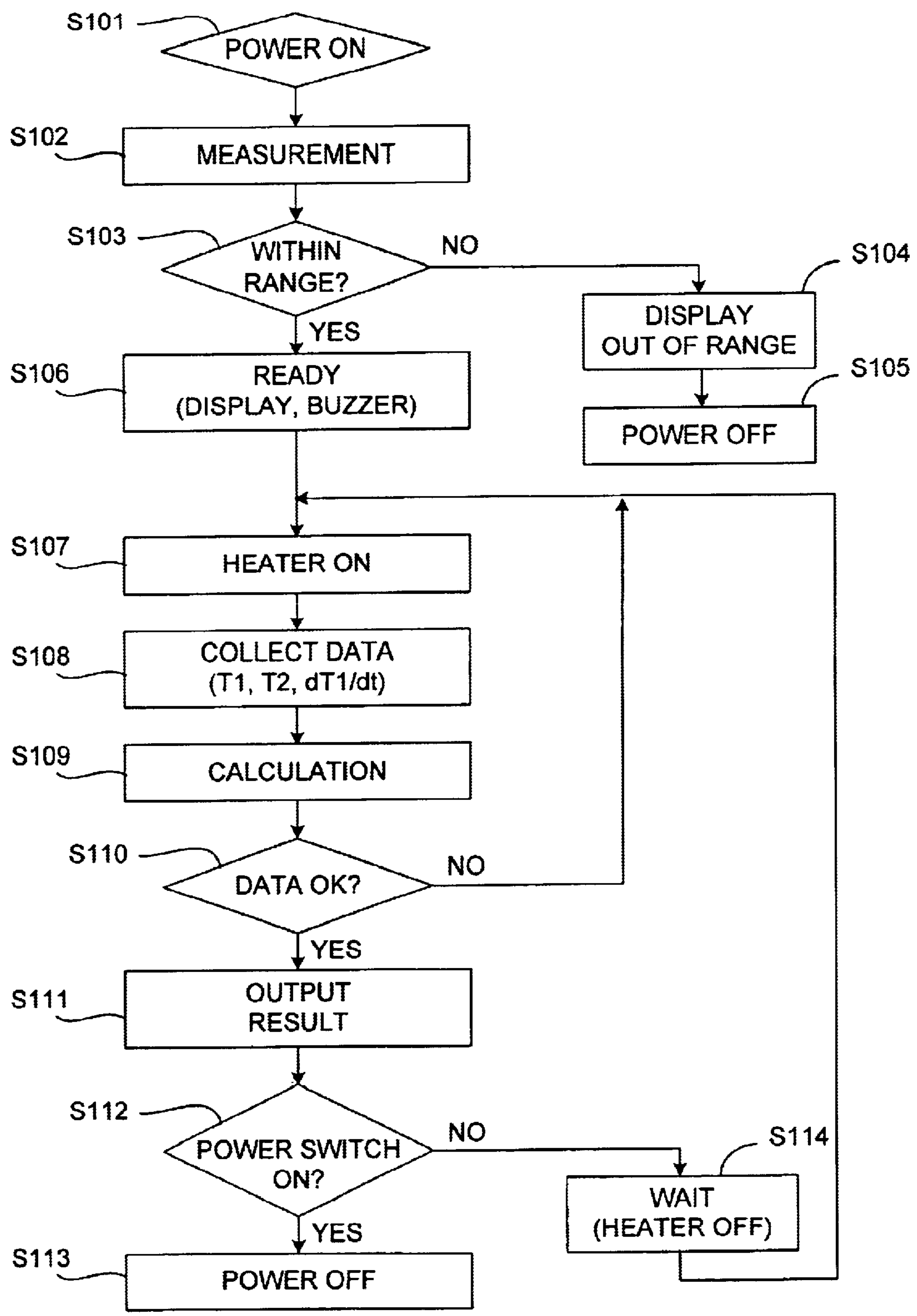
FIG. 5 is a flowchart of the process of taking a measurement by a thermometer according to the first embodiment of this invention.

FIG. 5 is referenced next to explain the process for measuring an internal body temperature. When the switch 5 is turned on (Step S101), a preliminary temperature measurement is taken by means of the temperature sensor 7 or 8 (Step S102) to determine whether or not this preliminarily obtained temperature is within a specified range (Step S103). If the measured temperature is not within the specified range (NO in Step S103), a display is made to this effect on the display device 4 (Step S104) and the power is switched off (Step S105). If the preliminarily measured temperature is within the specified range (YES in Step S103), a display is made to this effect on the display device 4 (Step S106) such as shown in FIG. 6A and the buzzer 18 may also be beeped to inform that the thermometer is ready to be used.

Next, the heater 10 is operated through the driver 13 (Step S107) and values of $T_1$, $T_2$ and $dT_1/dt$ are collected (Step S108). These data are now used by the calculator to estimate the temperature at an internal target position (Step S109).

Figure 6B:
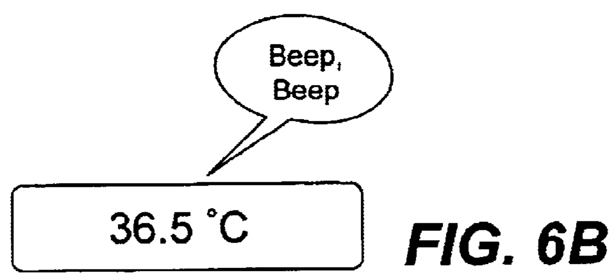

Next, it is examined whether or not data that are sufficient for a measurement have been collected (Step S110). If sufficient data have not been collected (NO in Step S110), the program returns to Step S107 and the heater 10 is driven. If sufficient data have been collected (YES in Step S110), the result of measurement is displayed on the display device 4, say, as shown in FIG. 6B and the buzzer 18 may be caused to beep twice to indicate that the result of measurement has been displayed (Step S111). Thereafter, it is checked whether power is switched on or off (Step S112). If the switch 5 is in the ON condition (YES in Step S112), powered is switched off (Step S113) and the process is concluded. If the power switch 5 is in the OFF condition (NO in Step S112), the heater 10 is switched off and is restarted (Step S107) after a wait period of a specified length (Step S114).

Figure 7:
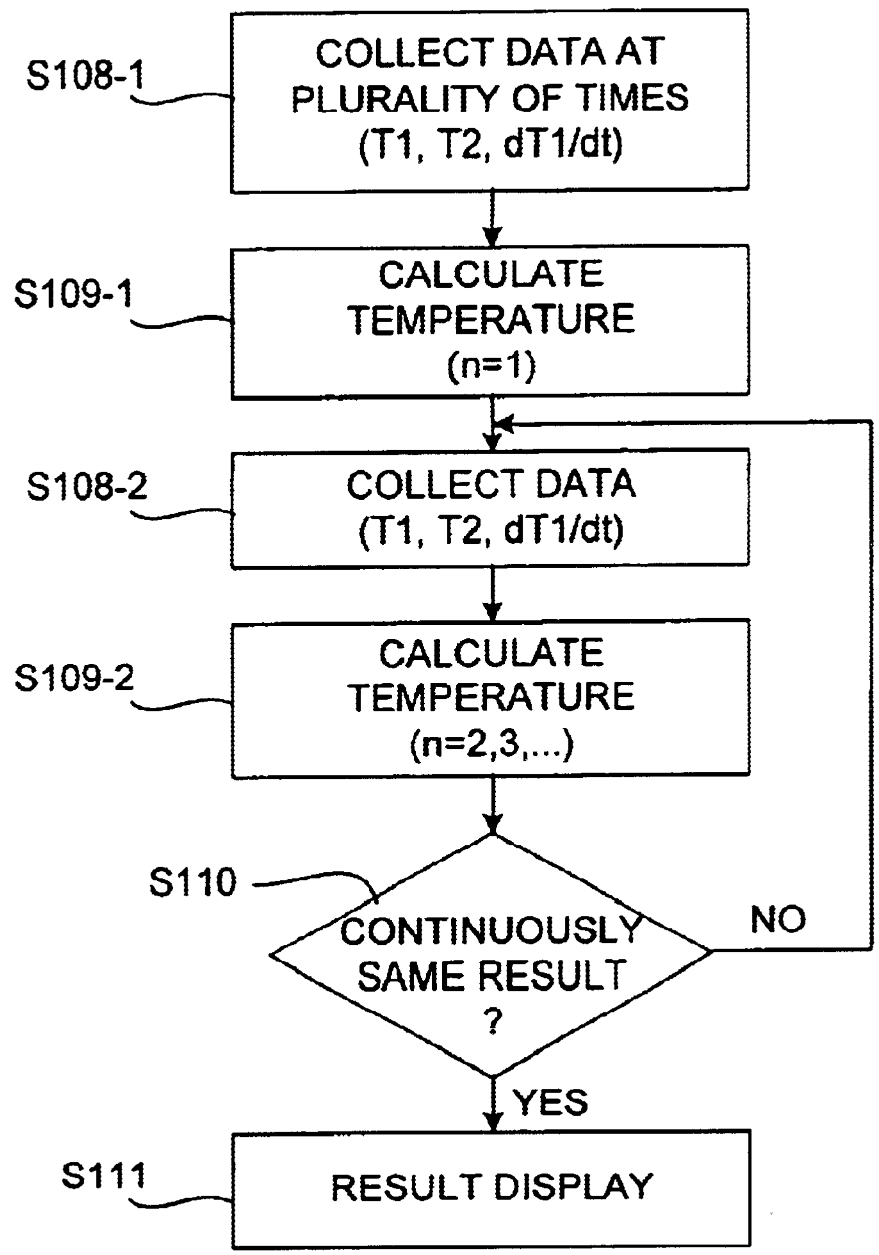
FIG. 7 is a portion of the flowchart of FIG. 5 shown more in detail.

The portion of the program explained above from Step S106 to Step S111 is shown more in detail in FIG. 7. After the display device 4 is caused to display that it is ready to take measurements, the heater 10 is activated and values of $T_1$, $T_2$ and $dT_1/dt$ are measured a plural number of times (Step S109-1). Next, it is checked if data that are sufficient for a measurement have been collected. This judgment may be taken by examining whether or not a plurality of successively calculated temperature values are nearly the same (say, to the second positions below the decimal point). Since this is the first (n=1) calculation and there is no other result to compare to, it is concluded in Step S110 that sufficient data have not been collected and the program returns to Step 107 (not shown in FIG. 7) to start the heater 10 and to repeat the collection of data (Step S108-2) and to calculate the next temperature value (Step S109-2). If the condition in Step S110 is finally satisfied (that is, if a plurality of temperature values calculated consecutively are sufficiently close to one another), it is set as the measured value and outputted to the display device 4 (Step S111).

The determination whether data sufficient for measurement have been collected may be made by examining whether or not a plurality of consecutively calculated temperature values are, say, within 0.01° C. of one another.

FIGS. 8A, 8B and 8C show methods of driving the heater 10 in the process described above. First, the heater 10 may be switched on and off at equal time intervals, as shown in FIG. 8A, such as 5 seconds. The temperature of the sensor 8 varies in a sawtooth manner as shown also in FIG. 8A. The ON-time of the heater 10 may be made shorter and the OFF-time longer. If the heater 10 is repeatedly switched on and off in this manner, the temperature of the temperature sensor 8 varies sinusoidally, as shown in FIG. 8B. FIG. 8C shows still another method whereby the heater 10 is kept in an ON condition for a specified length of time, switched on and off intermittently thereafter, again kept in an ON condition for another specified length of time, and again switched on and off intermittently for still another specified length of time. While the heater 10 is thus switched on and off intermittently, it is controlled such that the temperature of the sensor 8 is at a constant level. In this manner, the temperature may change as shown in FIG. 8C. It goes without saying that any other method of controlling the heater 10 is acceptable for the purpose of this invention because the purpose is to obtain different set of measured values of $T_1$, $dT_1/dt$ and $T_2$. Measurements may be repeated by intermittently repeating one period or a portion of one period of any of the waveforms shown in FIGS. 8A, 8B and 8C.

Thus, according to this invention, the temperature of the heater 10 is affirmatively varied such that the temperature sensor is prevented from coming into a thermal equilibrium with the body temperature. Thus, an accurate measurement can be performed even when the temperature sensor is used continuously or when measurements are taken without sufficient time in between.

FIGS. 9A and 9B show another electronic thermometer 11 which may be considered a variation of the first embodiment described above, being in the shape of a flat rectangular parallelopiped and having a probe 23 of approximately of a rectangular columnar shape protruding from one of the main surfaces of the thermometer 11 near one end part. On the opposite end part of the thermometer 11 are a display device 4 comprising an LCD and a power switch 5. Belts 24 are affixed at both ends in the longitudinal direction such that the probe 23 can be attached to a specified part of a patient's body such as the forehead by means of these belts 24 such that measurements can be taken continuously over an extended period of time. This embodiment is useful when a patient in the intensive care unit must be monitored or where a sudden change in body temperature is particularly important because the patient's body temperature can be outputted on real time.

Figure 10:
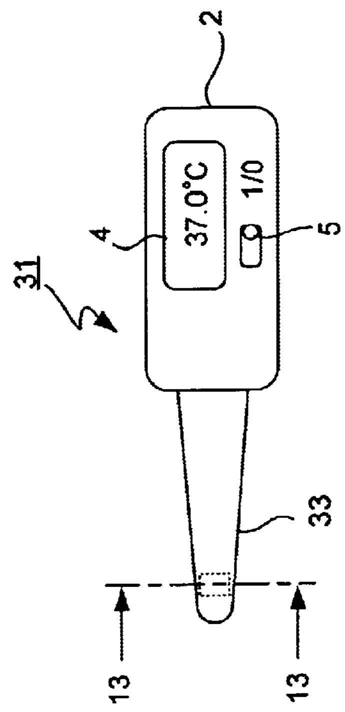
FIG. 10 is a sectional view taken along line 10—10 of the thermometer of FIGS. 9A and 9B for showing its internal structure.

FIG. 10 shows the internal structure of the probe 23 of the thermometer 11 shown in FIGS. 9A and 9B. Symbols 26*a*, 26*b* and 26*c* respectively indicate its top part, bottom part and side surface. The probe 23 is covered with a thin cover layer 26, say, of SUS. A temperature sensor 7 is disposed underneath the top part 26*a*. A nearly square-shaped insulating member 29 is disposed below the top part 26*a* of the cover layer 26, sandwiching the temperature sensor 7 with the top part 26*a* of the cover layer 26. A variable-temperature heater 10 is disposed on and contacting the lower surface of the insulating member 29. There is an empty space 30 between the insulating member 29 and the bottom part 26*c* of the cover layer 26.

Figure 11:
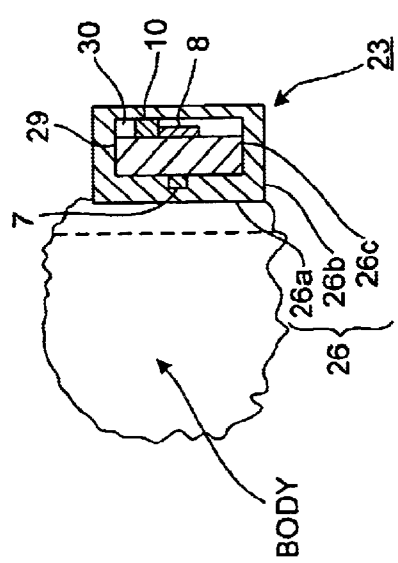
FIG. 11 is a sectional view of a portion of a patient's body for explaining the principle of measurement by a thermometer according to a second embodiment of this invention.

The thermometer 11 thus structured is particularly advantageous for use for an infant who may find it difficult to hold the probe steadily under an arm or under the tongue since the body temperature can be easily measured by contacting the probe 23 on a flat skin surface such as on the forehead. Since the thermometer is provided with belts, the thermometer can be kept in contact with the patient over an extended period of time FIG. 11 is referenced next to explain the principle of measurement by means of a thermometer according to a second embodiment of this invention characterized as having two insulating members 39*a* and 39*b* having different thermal conductivities $\lambda_1$ and $\lambda_2$ contacting the patient's body. Let To indicate the temperature of a variable-temperature heater 10 and $T_1$ and $T_2$ respectively indicate the temperature at a portion of the patient's body contacting the insulating members 39*a* and 39*b*. The flux of heat flow at each of these surface positions will be indicated by $q_1$ and $q_2$. If the temperature is $T_b$ inside the patient's body at a depth of h from the body surface, a one-dimensional heat transfer equation may be written as follows by keeping up to the second-order terms:

$$T_b=T_1+(h/\lambda_b)q_1+(h^2/2\alpha_b)(dT_1/dt),$$

$$T_b=T_2+(h/\lambda_b)q_2+(h^2/2\alpha_b)(dT_2/dt),$$

where $\alpha_b$ and $\lambda_b$ indicate the thermal diffusivity and the conductivity of the patient's body. Since $q_1=-\lambda_1(dT_1/dt)=-\lambda_1(T_1-T_0)/X$ and $q_2=-\lambda_2(dT_2/dt)=-\lambda_2(T_2-T_0)/X$ where X is the thickness of the insulating members 39*a* and 39*b*, the following obtains:

$$T_b=T_1+A(T_0-T_1)+B(dT_1/dt),$$

$$T_b=T_2+C(T_0-T_2)+D(dT_2/dt),$$

where A, B, C and D are constants. If $T_0$ is eliminated from these two equations, an equation is obtained relating $T_b$, $T_1$, $T_2$, $dT_1/dt$ and $dT_2/dt$. Thus, the inner body temperature $T_b$ of a patient can be obtained by measuring $T_1$, $T_2$, $dT_1/dt$ and $dT_2/dt$.

In summary, the inner body temperature can be calculated by measuring temperature and time-rate of change of temperature at two positions on the body surface which is being heated by a temperature-varying heater through different thermally insulating members. It goes without saying in this connection that these two insulating members do not have to have different thermal conductivities. They may be of the same material but different in thickness.

Figure 12:
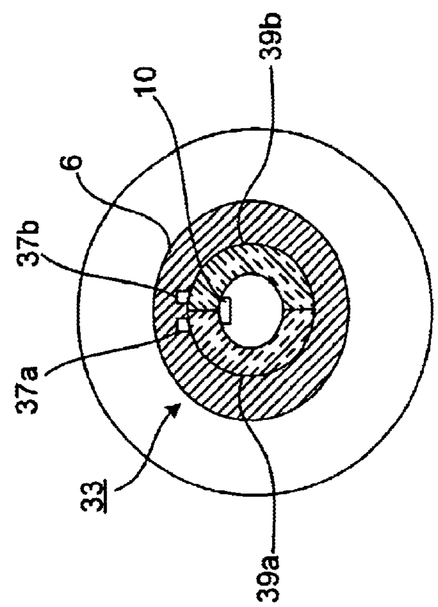
FIG. 12 is an external plan view of an electronic thermometer according to the second embodiment of the invention.

FIG. 12 shows an external view of a thermometer 31 according to the second embodiment of the invention. Since its external appearance is the same as that of the thermometer according to the first embodiment, the same symbols used in FIG. 2 are used for corresponding components and they are not repetitiously explained with reference to FIG. 12.

Figure 13:
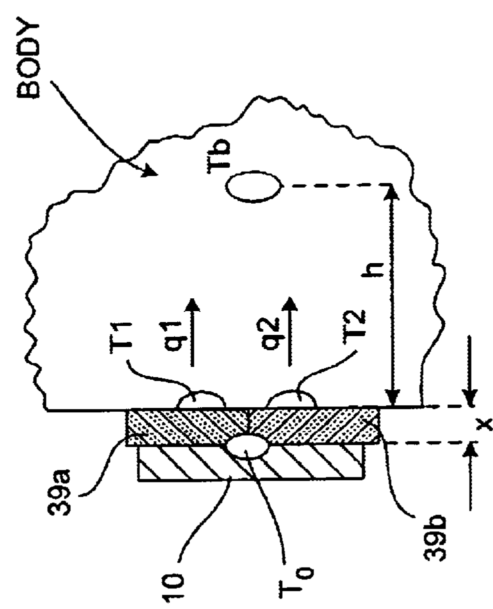
FIG. 13 is a sectional view of the thermometer of FIG. 12 taken along line 13—13.

FIG. 13 shows its internal structure. Its probe 33 is structured similarly to the probe 3 shown in FIG. 3 except that there are two (first and second) insulating members 39*a* and 39*b* each of semi-cylindrical shape on the inner surface of the cover 6. The two insulating members 39*a* and 39*b* have different thermal conductivity values. A (first or second) temperature sensor 37*a* or 37*b* is disposed between the outer surface of each of the insulator members 39*a* or 39*b* and the inner surface of the cover 6. A variable-temperature heater 10 is disposed on the inner surface of the insulating layers 39*a* and 39*b*, spanning over both and positioned opposite the first and second temperature sensors 37*a* and 37*b*. A thermometer thus structured with two temperature sensors and two different kinds of insulating members can be produced much less expensively than one using a heat flux sensor for measuring a flux of heat flow.

Figure 14:
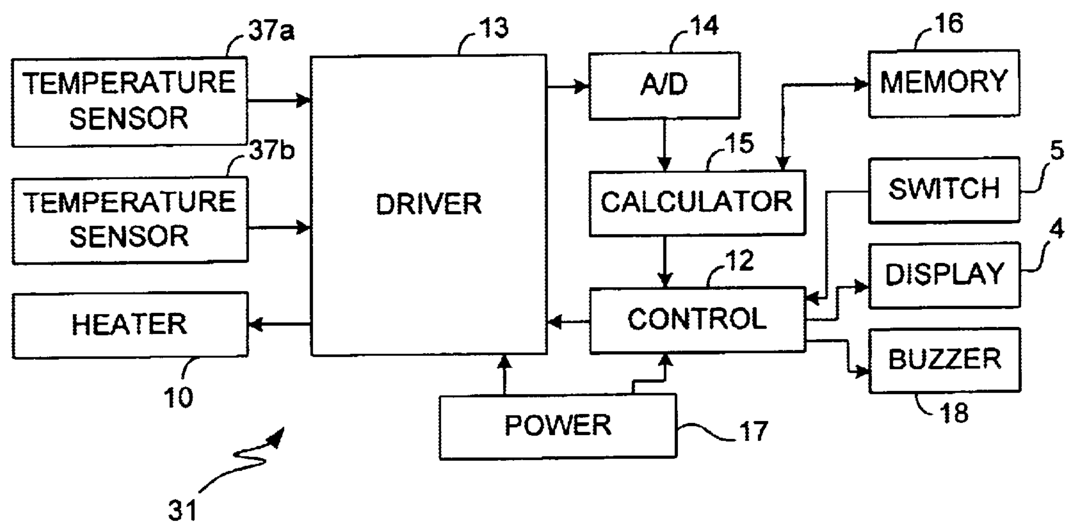
FIG. 14 is a block diagram for showing the circuit structure of the thermometer of FIG. 12.

FIG. 14 shows the internal circuit structure of the thermometer 31, which is similar to that shown by the block diagram of FIG. 4 except that the first and second temperature sensors 37*a* and 37*b* take the places of the temperature sensors 7 and 8 of FIG. 4.

Figure 15:
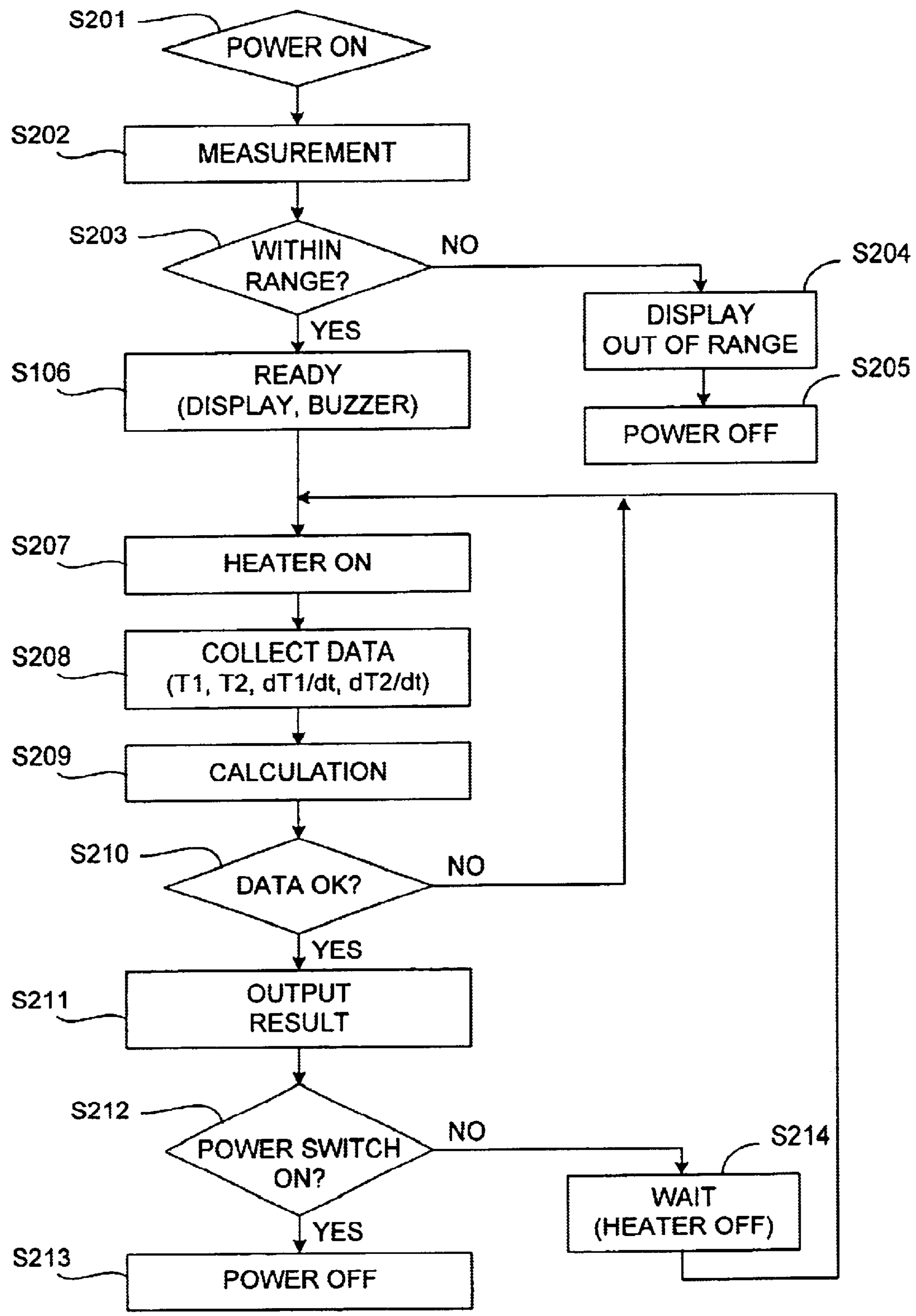
FIG. 15 is a flowchart of the process of taking a measurement by a thermometer according to the second embodiment of this invention.
Figure 16:
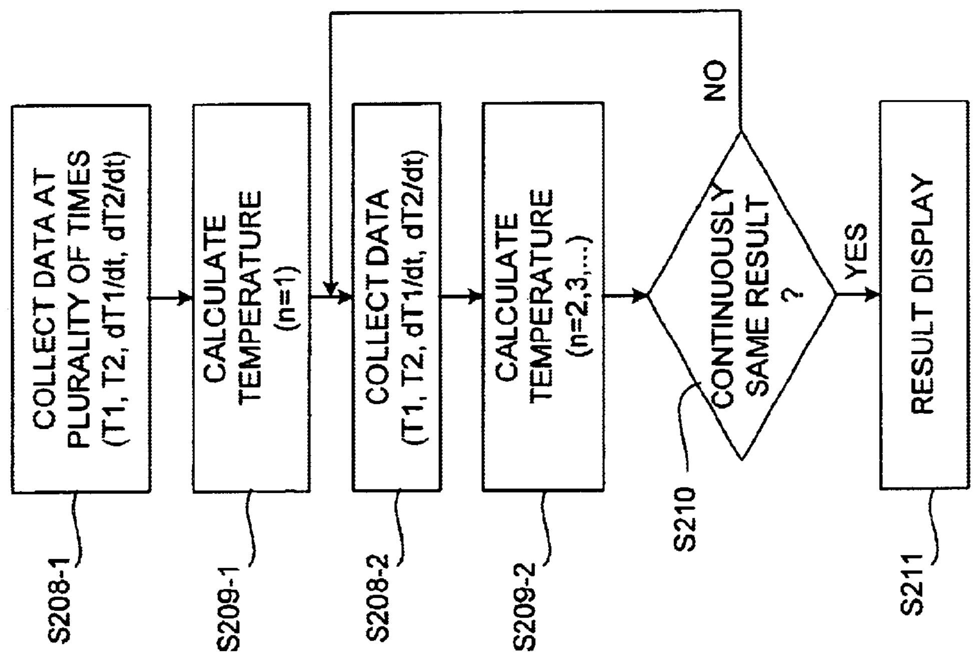
FIG. 16 is a portion of the flowchart of FIG. 15 shown more in detail.

FIG. 15 is referenced next to explain the process for measuring an internal body temperature. The steps shown in FIGS. 15 and 16 are substantially the same as those shown in the flowcharts of FIGS. 5 and 6 and hence will not be repetitiously explained. In Step S210 of FIG. 16, the determination may be whether or not a specified number of consecutively calculated values are within a specified maximum value such as 0.01° C. The heater 10 according to this embodiment of the invention may also be driven as shown in FIGS. 8A, 8B and 8C.

Thus, it is possible with a thermometer 31 according to the second embodiment of the invention, too, to prevent the thermometer from coming to a thermal equilibrium with the body because the variable-temperature heater 10 can be controlled so as to affirmatively vary its temperature. Thus accurate measurements are possible even when, for example, the thermometer is inserted into the ear of a patient for an extended period of time or when it is taken out of the ear and inserted again without waiting for an extended period of time.

It also goes without saying that the structure described above of the probe 33 with temperature sensors 37*a* and 37*b*, two insulating members 39*a* and 39*b* and a variable-temperature heater 10 may be applied to the kind of thermometer explained above with reference to FIGS. 9A and 9B.

Figure 17:
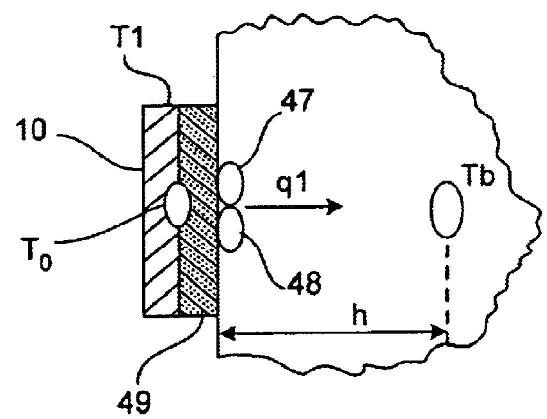
FIG. 17 is a sectional view of a portion of a patient's body for explaining the principle of measurement by a thermometer according to a third embodiment of this invention.

FIG. 17 is referenced next to explain the principle of measurement by means of a thermometer according to a third embodiment of this invention characterized as determining the temperature $T_b$ at an internal body position at a depth of h from a body surface by measuring the temperature $T_1$ and flux of heat flow $q_1$ at the patient's body surface opposite a variable-temperature heater 10 at temperature $T_0$ through a thermally insulating member with thermal conductivity $\lambda$.

From the definition of heat flux, $q_1=-\lambda(dT/dt)=-\lambda(T_1-T_b)/h$, it follows that $T_b=T_1+(h/\lambda)q_1$. Thus, the value of $T_b$ can be determined by measuring two or more pairs of values of $q_1$ and $T_1$.

Alternatively, one may start from the basic equation of heat transfer:

$$\partial T_1/\partial t=\alpha(\partial^2 T_1/\partial x^2)$$

where $\alpha$ is the thermal diffusivity. If the second-order term is included in its solution, this gives:

$$T_b=T_1+(h/\lambda)q_1+(h^2/2\alpha)(dT_1/dt)$$

since $q_1=-\lambda(dT_1/dx)$. This means that if three or more sets of values for $T_1$, $q_1$ and $dT_1/dt$ are measured, the value of $T_b$ can be estimated.

If the equation is of zeroth-order, the temperature at an internal body position can be estimated by a minimum of one measurement because there is no need to take in account any change with time. By making measurement for a plurality of times, accurate results can be obtained even by using a zeroth-order equation. If a higher-order equation is used, even more accurate estimates become possible. Examples of a heat flux sensor include layered structures and thermopiles.

Figure 18:
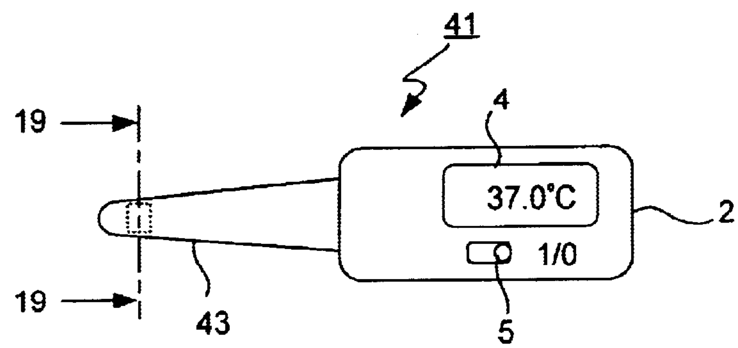
FIG. 18 is an external plan view of an electronic thermometer according to the third embodiment of the invention.

FIG. 18 shows an external view of a thermometer 41 according to the third embodiment of the invention. Since its external appearance is the same as that of the thermometer according to the first embodiment, the same symbols used in FIG. 2 are used for corresponding components and they are not repetitiously explained with reference to FIG. 18.

Figure 19:
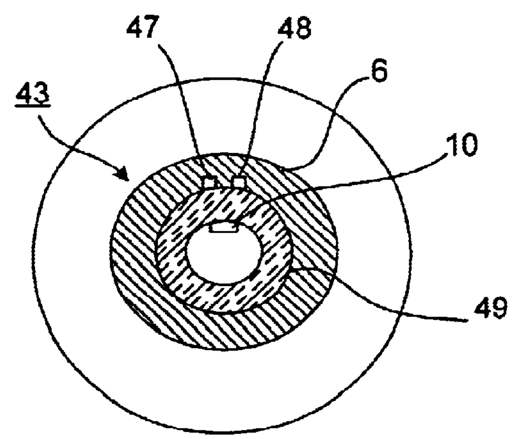
FIG. 19 is a sectional view of the thermometer of FIG. 18 taken along line 19—19.

FIG. 19 shows its internal structure. Its probe 43 is structured similarly to the probe 3 shown in FIG. 3 except that there are a temperature sensor 47 and a heat flux sensor 48 inserted between the inner surface of the cover 6 and the outer surface of a tubularly shaped insulating member 49. The insulating member 49 has a hollow interior and a variable-temperature heater 10 is disposed on the inner surface of the insulating member 49 and at a position opposite to both the temperature sensor 47 and the heat flux sensor 48.

Figure 20:
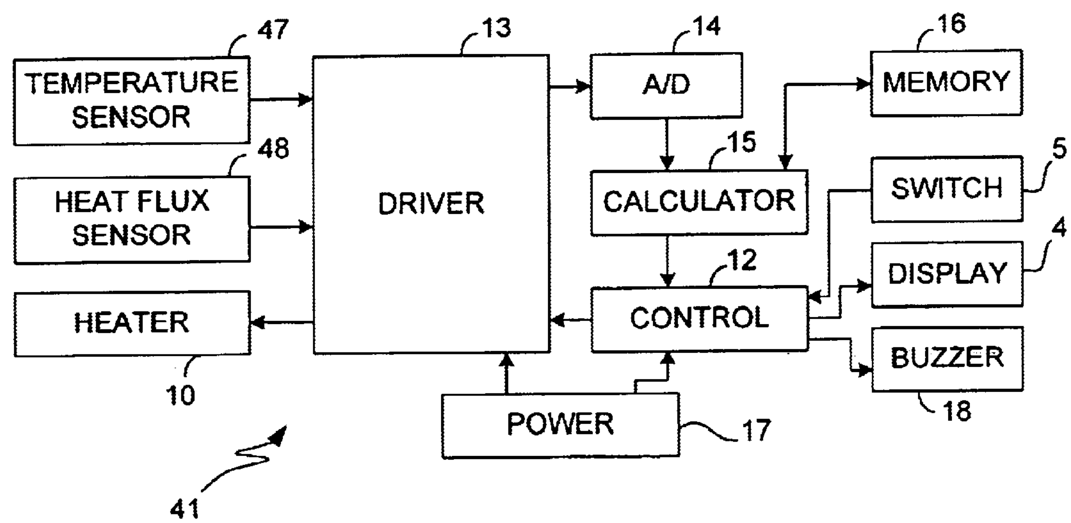
FIG. 20 is a block diagram for showing the circuit structure of the thermometer of FIG. 18.

FIG. 20 shows the internal circuit structure of the thermometer 41, which is similar to that shown by the block diagram of FIG. 4 except that the temperature sensor 47 and the heat flux sensor 48 take the places of the temperature sensors 7 and 8 of FIG. 4 and driven by signals from the controller 12.

Figure 22:
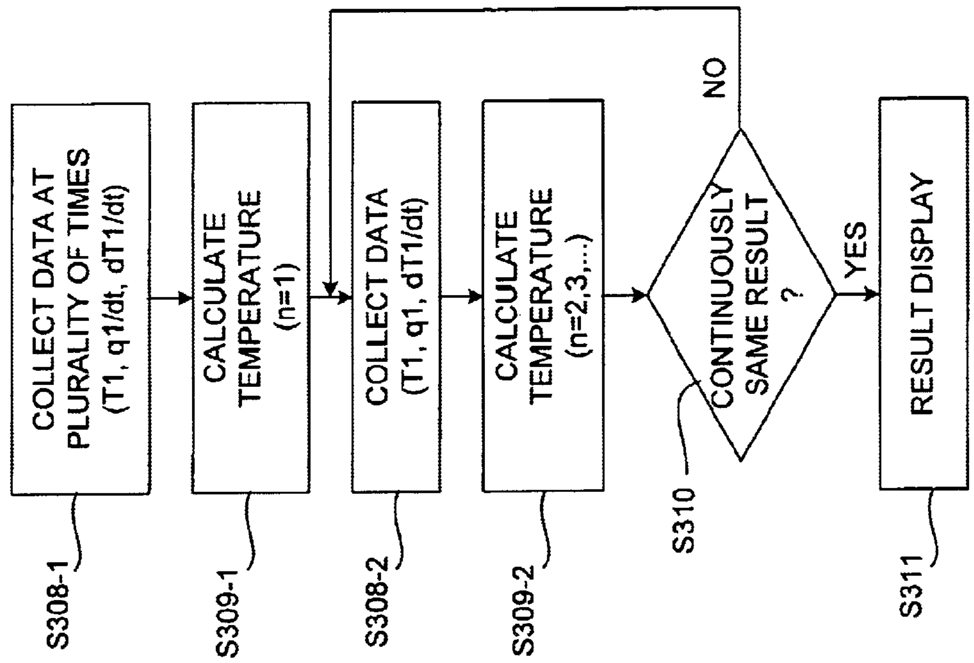
FIG. 22 is a portion of the flowchart of FIG. 21 shown more in detail.
Figure 21:
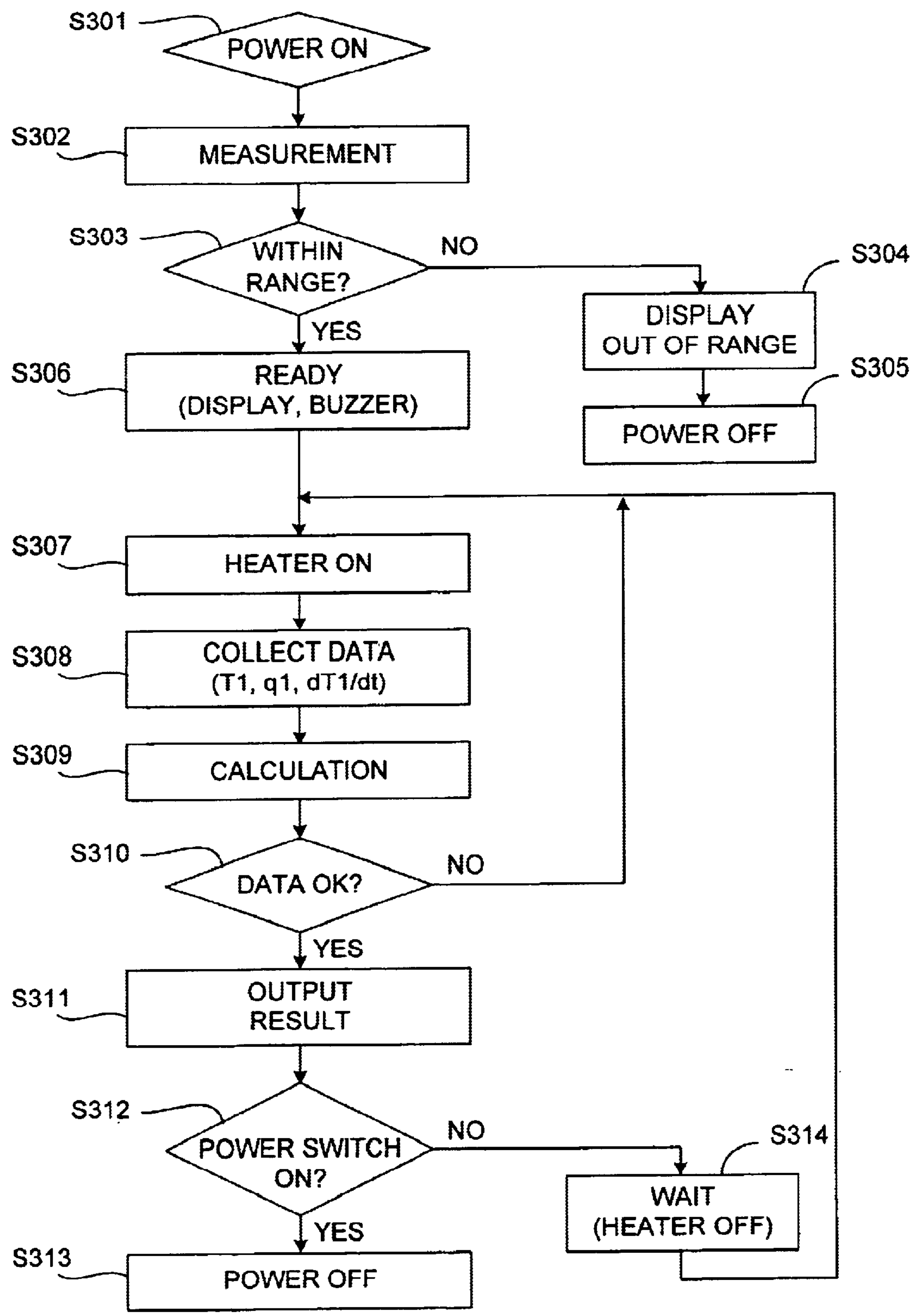
FIG. 21 is a flowchart of the process of taking a measurement by a thermometer according to the third embodiment of this invention.

FIGS. 21 and 22 are referenced next to explain the process for measuring an internal body temperature. The steps shown in FIGS. 21 and 22 are substantially the same as those shown in the flowcharts of FIGS. 5 and 6 and hence will not be repetitiously explained. In Step S310 of FIG. 22, the determination may be whether or not a specified number of consecutively calculated values are within a specified maximum value such as 0.01° C. The heater 10 according to this embodiment of the invention may also be driven as shown in FIGS. 8A, 8B and 8C.

Thus, it is possible with a thermometer 41 according to the third embodiment of the invention, too, to prevent the thermometer from coming to a thermal equilibrium with the body because the variable-temperature heater 10 can be controlled so as to affirmatively vary its temperature. Thus, accurate measurements are possible even when, for example, the thermometer is inserted into the ear of a patient for an extended period of time or when it is taken out of the ear and inserted again without waiting for an extended period of time.

It also goes without saying that the structure described above of the probe 43 with the temperature sensor 47, the heat flux sensor 48, the insulating member 49 and a variable-temperature heater 10 may be applied to the kind of thermometer explained above with reference to FIGS. 9A and 9B.

In summary, the present invention provides electronic thermometers capable of accurately measure the internal body temperature quickly and at a desired timing.

What is claimed is:

1. An electronic clinical thermometer comprising:

a temperature measuring device for measuring temperature;

a heater for heating the live body at a variable temperature of a live body; and an estimating circuit for estimating temperature inside said live body from said variable temperature of heating and temperatures measured at different times by said temperature measuring device.

2. The thermometer of claim 1 wherein said temperature measuring device comprises a first temperature sensor and a second temperature sensor, a thermally insulating member is disposed between said first temperature sensor and said second temperature sensor, said first temperature sensor measures temperature at a position proximal to said heater, and said second temperature sensor measures temperature at a position on said live body opposite said heater across said insulating material.

3. The thermometer of claim 1 wherein said temperature measuring device comprises a first temperature sensor and a second temperature sensor, said thermometer further comprises a first insulating member between said heater and said first temperature sensor and a second insulating member between said heater and said second temperature sensor, said first insulating member and said second insulating member having different heat-conducting properties, said first temperature sensor measures temperature on said live body at a position opposite said heater across said first insulating member, and said second temperature sensor measures temperature on said live body at another position opposite said heater across said second insulating member.

4. The thermometer of claim 1 further comprising a heat flux sensor and a thermally insulating member disposed between said heater and both said temperature measuring device and said heat flux sensor, wherein said estimating circuit estimates temperature inside said live body from said variable temperature of heating and measured values obtained by said temperature measuring device and said heat flux sensor, said temperature measuring device and said heat flux sensor being disposed opposite said heater across said insulating means and measuring respectively temperature and heat flux at positions proximal to each other.

5. The thermometer of claim 1 having a probe for contacting said live body, said probe being planar in shape.

6. The thermometer of claim 2 having a probe for contacting said live body, said probe being planar in shape.

7. The thermometer of claim 3 having a probe for contacting said live body, said probe being planar in shape.

8. The thermometer of claim 4 having a probe for contacting said live body, said probe being planar in shape.

9. The thermometer of claim 1 having a probe for contacting said live body, said probe being elongated in a bar-shape.

10. The thermometer of claim 2 having a probe for contacting said live body, said probe being elongated in a bar-shape.

11. The thermometer of claim 3 having a probe for contacting said live body, said probe being elongated in a bar-shape.

12. The thermometer of claim 4 having a probe for contacting said live body, said probe being elongated in a bar-shape.

13. The thermometer of claim 1 further comprising:

a controller for controlling operations of said thermometer in estimating temperature inside said live body; and a memory for storing temperature estimated by said estimating circuit;

wherein said estimating circuit estimates temperature inside said live body at specified time intervals and stores estimated temperature values in said memory.

14. The thermometer of claim 2 further comprising:

a controller for controlling operations of said thermometer in estimating temperature inside said live body; and a memory for storing temperature estimated by said estimating circuit;

wherein said estimating circuit estimates temperature inside said live body at specified time intervals and stores estimated temperature values in said memory.

15. The thermometer of claim 3 further comprising:

a controller for controlling operations of said thermometer in estimating temperature inside said live body; and a memory for storing temperature estimated by said estimating circuit;

wherein said estimating circuit estimates temperature inside said live body at specified time intervals and stores estimated temperature values in said memory.

16. The thermometer of claim 4 further comprising:

a controller for controlling operations of said thermometer in estimating temperature inside said live body; and a memory for storing temperature estimated by said estimating circuit;

wherein said estimating circuit estimates temperature inside said live body at specified time intervals and stores estimated temperature values in said memory.

17. An electronic clinical thermometer comprising:

a temperature measure device for measuring temperature;

a heater for heating the live body at a variable temperature of a live body; and an estimating circuit for estimating temperature inside a said live body from said variable temperature of heating, measured temperature obtained by said temperature measuring device while said live body is being heated by said heater and time-rates of change in said measured temperature.

18. The thermometer of claim 17 wherein said temperature measuring device comprises a first temperature sensor and a second temperature sensor, a thermally insulating member is disposed between said first temperature sensor and said second temperature sensor, said first temperature sensor measures temperature at a position proximal to said heater, and said second temperature sensor measures temperature at a position on said live body opposite said heater across said insulating material.

19. The thermometer of claim 17 wherein said temperature measuring device comprises a first temperature sensor and a second temperature sensor, said thermometer further comprises a first insulating member between said heater and said first temperature sensor and a second insulating member between said heater and said second temperature sensor, said first insulating member and said second insulating member having different heat-conducting properties, said first temperature sensor measures temperature on said live body at a position opposite said heater across said first insulating member, and said second temperature sensor measures temperature on said live body at another position opposite said heater across said second insulating member.

20. An electronic clinical thermometer comprising:

a temperature measuring device for measuring temperature;

a heater for heating the live body at a variable temperature of a live body;

a heat flux sensor and a thermally insulating member disposed between said heater and both said temperature measuring device and said heat flux sensor; and an estimating circuit for estimating temperature inside a said live body from said variable temperature of heating and measured values obtained by said temperature measuring device and said heat flux sensor while said live body is being heated by said heater.

21. The electronic clinical thermometer of claim 20 wherein said temperature measuring device and said heat flux sensor are disposed opposite said heater across said insulating means and serve to measure respectively temperature and heat flux at positions proximal to each other.

* * * * *